United States Patent
Cha et al.

(10) Patent No.: US 12,488,566 B2
(45) Date of Patent: Dec. 2, 2025

(54) SYSTEM AND METHOD FOR EXTRACTING OBJECT INFORMATION FROM DIGITAL IMAGES TO EVALUATE FOR REALISM

(71) Applicant: Accenture Global Solutions Limited, Dublin (IE)

(72) Inventors: Sujeong Cha, Seattle, WA (US); Surya Raghavendra Vadlamani, Newtown, PA (US); Sukryool Kang, Pleasanton, CA (US); Anupam Anurag Tripathi, Chicago, IL (US); Mohamed Suhail, Santa Clara, CA (US); Peter Royer Smith, Jr., Sharon, CA (US); Bo Zhang, San Diego, CA (US); Daniel Garrison, Washington, MI (US); Jatinder Singh, New York, NY (US); Neha Wadhwa Dang, New Delhi (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 293 days.

(21) Appl. No.: 18/478,265

(22) Filed: Sep. 29, 2023

(65) Prior Publication Data
US 2025/0005901 A1    Jan. 2, 2025

Related U.S. Application Data

(60) Provisional application No. 63/511,339, filed on Jun. 30, 2023.

(51) Int. Cl.
*G06V 10/764* (2022.01)
*G06T 5/20* (2006.01)
(Continued)

(52) U.S. Cl.
CPC .............. *G06V 10/764* (2022.01); *G06T 5/20* (2013.01); *G06T 7/50* (2017.01); *G06V 10/761* (2022.01);
(Continued)

(58) Field of Classification Search
CPC .... G06V 10/764; G06V 10/761; G06V 20/70; G06V 2201/07; G06V 10/26;
(Continued)

(56) References Cited

U.S. PATENT DOCUMENTS 11,995,803 B1 *   5/2024   Karpman ................. G06T 5/70
2018/0330187 A1 * 11/2018  Ouzounis ................. G06T 7/90
(Continued)

OTHER PUBLICATIONS

Rastegar et al, Designing a new deep convolutional neural network for content-based image retrieval with relevance feedback, Computers and Electrical Engineering vol. 106, Mar. 2023, 108593 (Year: 2023).*

(Continued)

*Primary Examiner* — Andrae S Allison
(74) *Attorney, Agent, or Firm* — Mannava & Kang, P.C

(57) ABSTRACT

Described herein are systems, methods, devices, and other techniques for comprehensive and automated evaluation of digital images generated from artificial intelligence (AI) models in order to promote accurate representations of real-world content. Prompts are received at the system that are then passed to both a search engine and a generative AI model. Synthesized digital images are obtained from the generative AI model. The top-matching image from the search engine is used as a verification of the ground truth of the synthesized digital images. A realism score is generated for each synthesized digital image that characterizes the accuracy of the synthesized digital image with reference to the verification image. The realism score can be used to assist and expedite the image selection process, as well as (Continued)

serve as input to fine-tune the performance of generative models.

20 Claims, 8 Drawing Sheets

(51) Int. Cl.
    *G06T 7/50*         (2017.01)
    *G06V 10/74*      (2022.01)
    *G06V 20/70*      (2022.01)

(52) U.S. Cl.
    CPC .......... *G06V 20/70* (2022.01); *G06V 2201/07* (2022.01)

(58) Field of Classification Search
    CPC ...... G06V 10/435; G06V 10/74; G06V 10/82; G06T 5/20; G06T 7/50
    See application file for complete search history.

(56) References Cited

U.S. PATENT DOCUMENTS

| | | | | |
|---|---|---|---|---|
| 2020/0210770 | A1* | 7/2020 | Bala | G06F 18/28 |
| 2020/0294239 | A1* | 9/2020 | Brada | G06T 7/10 |
| 2021/0312102 | A1* | 10/2021 | Museth | G06T 13/60 |
| 2023/0095092 | A1* | 3/2023 | Xiao | G06T 5/60 382/254 |
| 2023/0103638 | A1* | 4/2023 | Saharia | G06V 10/454 382/155 |
| 2024/0054720 | A1* | 2/2024 | Fidler | G06T 19/006 |
| 2025/0265290 | A1* | 8/2025 | Jia | G06F 16/538 |

OTHER PUBLICATIONS

AbuRass et al, Enhancing Convolutional Neural Network using Hu's Moments, (IJACSA) International Journal of Advanced Computer Science and Applications, vol. 11, No. 12, 2020 (Year: 2020).*

Shilin Lu, Yanzhu Liu, Adams Wai-Kin Kong; TF-ICON: Diffusion-Based Training-Free Cross-Domain Image Composition Proceedings of the IEEE/CVF International Conference on Computer Vision (ICCV), 2023, pp. 2294-230 (Year: 2023).*

Lu et al, Specialist Diffusion: Plug-and-Play Sample-Efficient Fine-Tuning of Text-to-Image Diffusion Models to Learn Any Unseen Style, 2023 IEEE/CVF Conference on Computer Vision and Pattern Recognition (CVPR) (Year: 2023).*

Hafiz et al., "A Survey on Instance Segmentation: State of the art", 2020 ; https://arxiv.org/ftp/arxiv/papers/2007/2007.00047.pdf.

Hu, Ming-Kuei, "Visual Pattern Recognition By Moment Invariants" ; IRE Transactions on Information Theory ; vol. 8, Issue: 2, Feb. 1962, pp. 17187.

Roy Hachnochi et al: "Cross-domain Compositing with Pretrained Diffusion Models", arxiv.org, Cornell University Library, 201 Olin Library Cornell University Ithaca, NY 14853, May 25, 2023 XP091517911, pp. 1-18.

Zou Xueyan et al: "Segment Everything Everywhere All at Once", arXiv, May 1, 2023 , pp. 1-11.

Minguk Kang et al: "Scaling up GANS for Text-to-Image Synthesis", arxiv.org, Cornell University Library, 201 Olin Library Cornell University Ithaca, NY 14853, Jun. 19, 2023, pp. 1-36.

Leigang Qu et al: "Unified Text-to-Image Generation and Retrieval", arxiv.org, Cornell University Library, 201 Olin Library Cornell University Ithaca, NY 14853, Jun. 9, 2024, pp. 1-28.

* cited by examiner

SYSTEM AND METHOD FOR EXTRACTING OBJECT INFORMATION FROM DIGITAL IMAGES TO EVALUATE FOR REALISM

CROSS REFERENCE TO RELATED APPLICATION

This application claims the benefit of U.S. Provisional Patent Application No. 63/511,339, filed Jun. 30, 2023, and titled "System and Method for Quantitative Realism Assessment in AI-Generated Images," which is incorporated by reference herein in its entirety.

TECHNICAL FIELD

The present disclosure generally relates to a method and system for assessing the realism of a digital image generated from Generative Artificial Intelligence (AI). More specifically, the present disclosure relates to a system and method for an objective and quantitative measurement of the degree of realism in image content that was created using Generative AI.

BACKGROUND

Humankind is entering a novel era of creativity—an era in which anybody can synthesize digital content. The paradigm under which this revolution takes place is prompt-based learning (or in-context learning). This paradigm has found fruitful application in text-to-image generation where it is being used to synthesize digital images from zero-shot text prompts in natural language for the purpose of creating AI art. This activity is referred to as prompt engineering—the practice of iteratively crafting prompts to generate and improve images.

However, even though prompts can specify certain landmarks, objects, and scenes with text-based descriptors and labels used to generate artworks or other visual products, users may find that their requested images fall short in their verisimilitude. In other words, while the images can appear realistic (i.e., can exist in the real world), they can include details (or lack thereof) that fall short with respect to their actual correspondence to the existing real-world scene that the user had desired. Users may not notice these details or discrepancies, as they may be relatively minor, or a user is simply unfamiliar with the real-world scene themselves and so have no standard for judging whether the image reflects the desired scene with any degree of realism. This can lead to loss of credibility for the user if they employ the image for any critical purpose, or cause mistakes that propagate down the line. Thus, the development of tools for users to readily evaluate the realism of an AI-generated image is highly desirable.

There is a need in the art for a system and method that addresses the shortcomings discussed above.

SUMMARY

A realism assessment system that improves the performance and output of generative artificial intelligence (AI) models are disclosed. The system and method solve the problems discussed above by determining whether a given synthetic digital image is aligned with a ground truth of the target subject matter. In some embodiments, the proposed systems can be employed to perform AI model evaluations and fine-tuning of the model output, to ensure the modeling process aligns more closely with the user's intended goals. For example, the proposed systems can be utilized as a guideline for image pre-selection, reducing the time spent by users in choosing the right image based on their prompt and the level of realism assigned to the image. In different embodiments, this framework can further be used to evaluate the quality and accuracy of the generated images in a consistent and systematic matter.

The disclosed system and method can improve the performance of the generative AI by providing a way to automatically determine how closely the outputted synthesized digital images represent real-world content. For example, the method of generating the realism scores for each image may include classifying the pixels in each image as specific objects, extracting object information (such as feature vector representations, e.g., Hu moment-based characteristics) of these objects, and comparing the extracted object information of these objects, such that the objects can be compared even when viewed from different perspectives or orientations. Feature vector representations like Hu moment-based characteristics make it possible to automatically match objects that may not immediately appear identical but correspond to the same real-world content. The disclosed system and method provide a way to identify objects in digital images and compare the objects without regard for appearing to be exactly the same. The compared objects may be determined to be similar even though the objects are shown in different perspectives or on a different scale.

The disclosed system and method can also improve the process of training a generative AI by using the realism scores to filter out synthetic digital images that do not align with the desired level of real-world content, or fall below a preselected threshold of accuracy. In some embodiments, synthetic digital images that do not meet a preselected level of accuracy can be automatically excluded from presentation to the user.

The disclosed system and method can also allow the user to readily select a generative AI tool based on the accuracy of the images that it generates, where the accuracy is determined by the proposed system and realism scoring paradigm.

In one aspect, the disclosure provides a computer-implemented method for extracting object information from digital images. The method may include receiving, at a realism assessment system, a user prompt involving real-world content. The method may include submitting, from the realism assessment system and to a web-based search engine, the user prompt. The method may include receiving, at the realism assessment system, a reference digital image retrieved by the search engine in response to the user prompt. The method may include submitting, from the realism assessment system and to a first generative AI model, the user prompt. The method may include receiving, at the realism assessment system, a plurality of synthetic digital images including a first synthetic digital image and a second synthetic digital image, the plurality of synthetic digital images generated by the first generative AI model in response to the user prompt. The method may include automatically classifying, via a deep learning-based instance segmentation model of the realism assessment system, a first set of pixels in the reference digital image as corresponding to a first object, a second set of pixels in the first synthetic digital image as corresponding to a second object, and a third set of pixels in the second synthetic digital image as corresponding to a third object. The method may include extracting one or more Hu Moments for each of the first object, the second object, and the third object. The method may include generating, at the realism assessment system, a first realism score based on a comparison of characteristics of the first object with the second object by comparing the one or more Hu Moments for the first object and the second object. The method may include generating, at the realism assessment system, a second realism score based on a comparison of characteristics of the first object with the third object by comparing the one or more Hu Moments for the first object and the third object, the second realism score being greater than the first realism score. The method may include determining, at the realism assessment system, the second synthetic digital image has a greater likelihood of accurately representing the real-world content than the first synthetic digital image based on the second realism score being greater than the first realism score. The method may include ranking each synthetic digital image of the plurality of synthetic digital images based on their computed realism score and presenting, at a computing device, the synthetic digital images in order of their ranking.

In another aspect, the disclosure provides a non-transitory computer-readable medium storing software comprising instructions executable by one or more computers which, upon such execution, cause the one or more computers to extract object information from digital images by performing the following: (1) receiving, at a realism assessment system, a user prompt involving real-world content; (2) submitting, from the realism assessment system and to a web-based search engine, the user prompt; (3) receiving, at the realism assessment system, a reference digital image retrieved by the search engine in response to the user prompt; (4) submitting, from the realism assessment system and to a first generative artificial intelligence (AI) model, the user prompt; (5) receiving, at the realism assessment system, a plurality of synthetic digital images including a first synthetic digital image and a second synthetic digital image, the plurality of synthetic digital images generated by the first generative AI model in response to the user prompt; (6) automatically classifying, via a deep learning-based instance segmentation model of the realism assessment system, a first set of pixels in the reference digital image as corresponding to a first object, a second set of pixels in the first synthetic digital image as corresponding to a second object, and a third set of pixels in the second synthetic digital image as corresponding to a third object; (7) extracting one or more Hu Moments for each of the first object, the second object, and the third object; (8) generating, at the realism assessment system, a first realism score based on a comparison of characteristics of the first object with the second object by comparing the one or more Hu Moments for the first object and the second object; (9) generating, at the realism assessment system, a second realism score based on a comparison of characteristics of the first object with the third object by comparing the one or more Hu Moments for the first object and the third object, the second realism score being greater than the first realism score; (10) determining, at the realism assessment system, the second synthetic digital image has a greater likelihood of accurately representing the real-world content than the first synthetic digital image based on the second realism score being greater than the first realism score; and (11) ranking each synthetic digital image of the plurality of synthetic digital images based on their computed realism score and presenting, at a computing device, the synthetic digital images in order of their ranking.

In yet another aspect, the disclosure provides a system for extracting object information from digital images, the system comprising one or more computers and one or more storage devices storing instructions that may be operable, when executed by the one or more computers, to cause the one or more computers to: (1) receive, at a realism assessment system, a user prompt involving real-world content; (2) submit, from the realism assessment system and to a web-based search engine, the user prompt; (3) receive, at the realism assessment system, a reference digital image retrieved by the search engine in response to the user prompt; (4) submit, from the realism assessment system and to a first generative artificial intelligence (AI) model, the user prompt; (5) receive, at the realism assessment system, a plurality of synthetic digital images including a first synthetic digital image and a second synthetic digital image, the plurality of synthetic digital images generated by the first generative AI model in response to the user prompt; (6) automatically classify, via a deep learning-based instance segmentation model of the realism assessment system, a first set of pixels in the reference digital image as corresponding to a first object, a second set of pixels in the first synthetic digital image as corresponding to a second object, and a third set of pixels in the second synthetic digital image as corresponding to a third object; (7) extracting one or more Hu Moments for each of the first object, the second object, and the third object; (8) generating, at the realism assessment system, a first realism score based on a comparison of characteristics of the first object with the second object by comparing the one or more Hu Moments for the first object and the second object; (9) generating, at the realism assessment system, a second realism score based on a comparison of characteristics of the first object with the third object by comparing the one or more Hu Moments for the first object and the third object, the second realism score being greater than the first realism score; (10) determine, at the realism assessment system, the second synthetic digital image has a greater likelihood of accurately representing the real-world content than the first synthetic digital image based on the second realism score being greater than the first realism score; and (11) rank each synthetic digital image of the plurality of synthetic digital images based on their computed realism score and present, at a computing device, the synthetic digital images in order of their ranking.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1A:
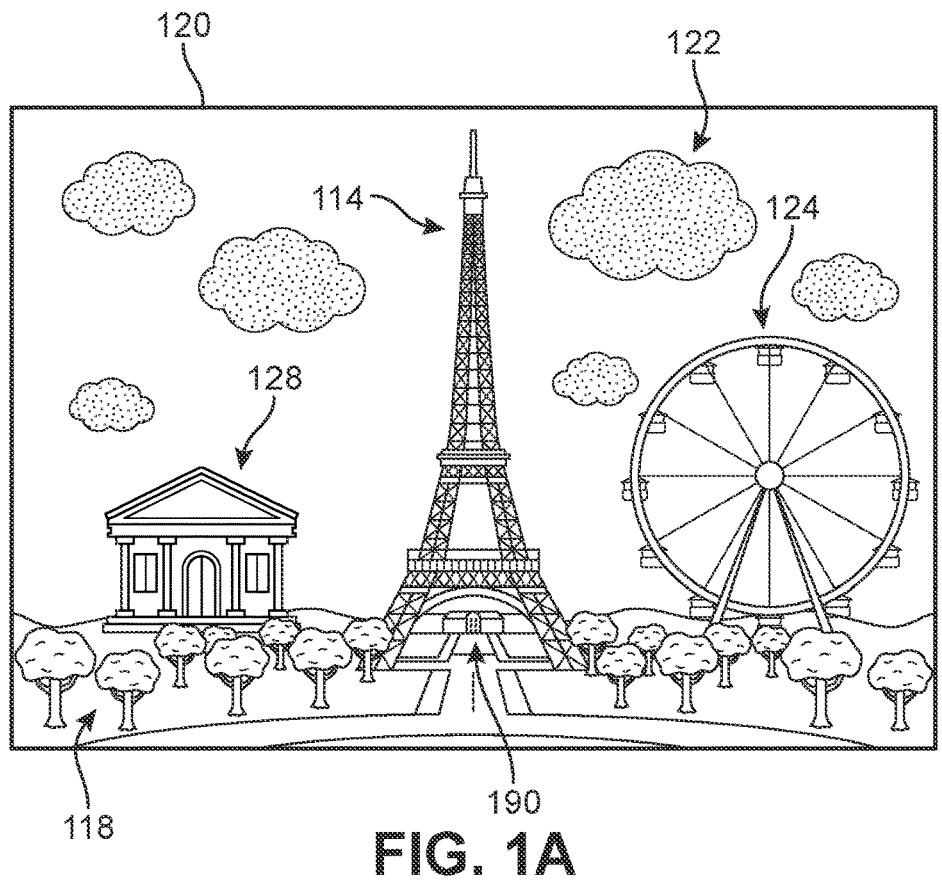
FIG. 1A is a depiction of an image synthesized by a generative artificial intelligence (AI) model.

Described herein are systems, methods, devices, and other techniques for comprehensive evaluation of images generated from artificial intelligence (AI) models. In some embodiments, the proposed systems can be employed to perform AI model evaluations and fine-tuning of the model output, to ensure the modeling process aligns more closely with the user's intended goals. For example, the proposed systems can be utilized as a guideline for image pre-selection, reducing the time spent by users in choosing the right image. In different embodiments, this framework can further be used to evaluate the quality and accuracy of the generated images in a consistent and systematic matter. The evaluation may be used as input to fine-tune the AI model to improve the model output.

Recent years have witnessed a rapid growth of deep generative models, with text-to-image models gaining significant attention from the public. There has been a massive shift in the creative landscape following the release of artificial intelligence-based technologies, and in particular with text-to-image models, such as DALL-E, Midjourney, Stable Diffusion, and others, which have gained considerable attention from the industry, and their range of applications is expanding rapidly. These models are commonly utilized in various scenarios, such as seeking inspiration for new logo designs or compiling mood boards, where their "creative" capabilities shine. However, it can be appreciated that in many situations, such as generating promotional videos for products or locations, although creativity is helpful, it becomes more important to generate images that closely resemble reality.

As a general matter, conditional generative models allow the generation of a desired output based on a user-specified condition. For generative text-to-image models such as DALL-E or Stable Diffusion, this means that the model generates images conditional on a text description known as a "prompt". For a user, the prompt is the primary means of controlling the generated image. If an ad hoc prompt does not produce a satisfactory result, the user usually interacts with the model by adjusting the prompt until they get one, or they give up after a few tries. Since such systematic refinement of prompts is often necessary to achieve a satisfactory result, writing prompts has evolved into the art of "prompt engineering", for which users exchange best practices in drafting text-based requests for images. It is often not obvious how to change a prompt to steer image generation in a particular direction. In some cases, users may approach their use of generative text-to-image models as a type of search engine index, such that their prompt is understood as a request that represents a user's need for information. Prompt engineering can then be considered a form of interactive text-based retrieval, in which a user interacts with the model by modifying their prompt as if to refine their query to find a result that meets their needs.

This approach raises a number of new challenges: when using a generative model, the initiative currently lies solely with the user, without support from the model as a "retrieval system". There is no intermediary retrieval model to help users produce satisfactory and true-to-life images. A striking difference from traditional retrieval is that when generative models are used as an index, new results are generated rather than existing ones retrieved. In other words, a non-empty result is returned for every conceivable query prompt. This includes query prompts for which a traditional retrieval system would return no results. Furthermore, the number of different results that can be generated per query prompt is not conceptually limited, but only by the available computational capacity for model inference. Thus, a generative model is effectively an "infinite index". If a user is seeking to generate a true-to-life representation of a particular object, location, person, etc., via a text-to-image AI model, such an infinite index can actually increase the likelihood of the generated image including non-realistic elements.

For purposes of reference, two terms may be used herein to help describe some of the applications of the proposed embodiments: (a) content and (b) style. These two terms, content and style, are two fundamental elements in the analysis of visual art. In general, content describes the concepts depicted in the image, such as the objects, people, or locations. It addresses the question of what the image is about. On the other hand, style describes the visual appearance of the image: its color, composition, or shape, thereby addressing the question of how the image looks. Through a unique combination of content and style, an image will be represented. Whereas for humans, content and style are easily distinguishable (we can often tell apart the topics depicted in an image from their visual appearance without much trouble), the boundary is not so clear from a computer vision perspective. Traditionally, for analyzing content in artworks, computer vision relies on object recognition techniques. However, even when artworks contain similar objects, the subject matter may still be different. Likewise, the automatic analysis of style is not without controversy. As there is not a formal definition of what visual appearance is, there is a degree of vagueness and subjectivity in the computation of style. As will be described herein, some of the proposed embodiments seek to facilitate the generation of images that are accurate with respect to content, while permitting variations in the style of the image to foster creativity based on a user's prompts.

In different embodiments, the proposed embodiments can greatly benefit users of generative AI tools. For example, it can be appreciated that with the advent of generative AI, users can be presented with multiple images generated by AI models. In other words, the generative AI can be used to generate a plurality of synthetic digital images based on the user's prompt. Individual users, particularly those lacking extensive domain expertise, may face challenges in determining which image best approximates the real-world (has a high degree of veracity or ground truth relative to that which actually exists). With the proposed systems and methods, users can be presented with objective, quantitative measurements that rate, score, evaluate, or rank the realism (i.e., how close they are to representing real-world already-existing scenes and objects) of images generated from generative AI, thereby assisting users to make grounded decisions.

Figure 1B:
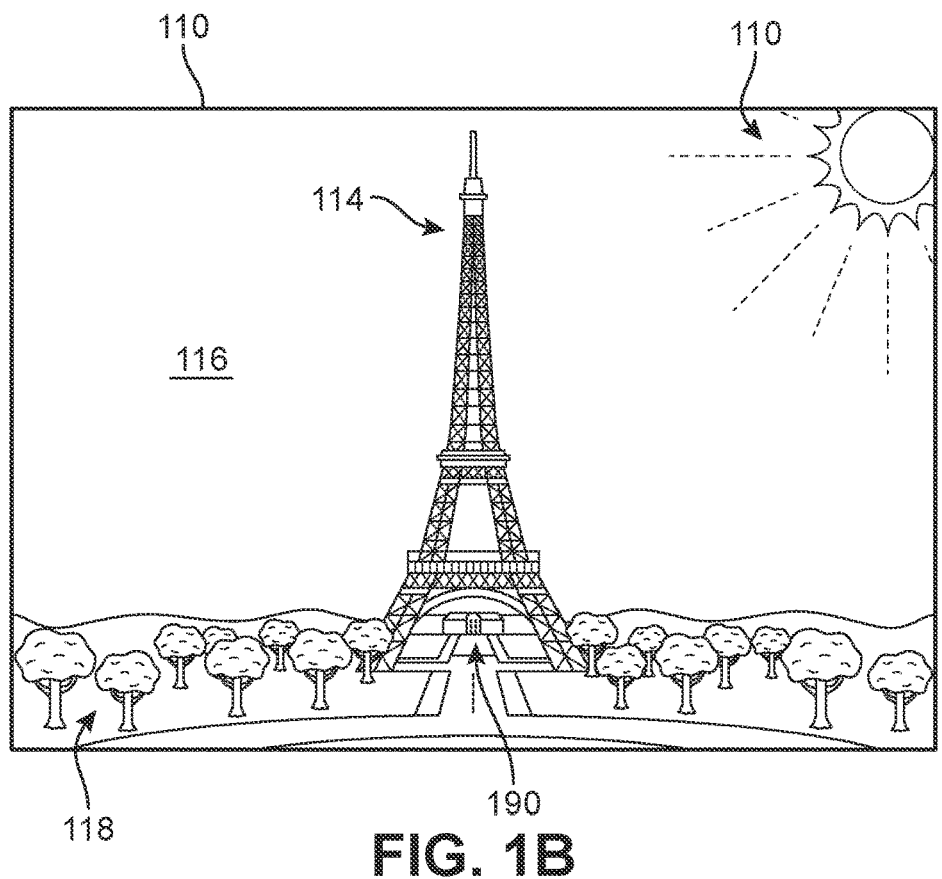
FIG. 1B is a depiction of an image retrieved from a search engine, for evaluation by a realism assessment system, according to an embodiment.

Simply for purposes of illustration, an example use case related to the travel industry is depicted with reference to FIGS. 1A and 1B. In this example, a user (such as a travel brochure production company) may desire inclusion of a representative image of a particular city with various styles to convey different moods or to attract different clients. In this specific example, the user submitted a prompt to an AI-based image generation engine (e.g., Midjourney, etc.) to produce a festive-styled representation of the city of Paris, France. In response to the user's prompt, the engine generates a first picture 120 shown in FIG. 1A, which reflects a prominent landmark 114 located in Paris (i.e., the Eiffel Tower) with a sunny environment 122. There are also additional elements (content) that are shown, including a Ferris wheel 124 directly to the right of the landmark 114, and a building 128 (e.g., a museum) directly to the left of the landmark 114, and a visitor center 190 below the structure of the landmark 114. These elements are placed within a larger park 118 that surrounds the area and in which the landmark 114 is installed. The user—not having visited Paris themselves—may view this first picture 120 and believe this is an appropriate image for inclusion in their travel brochure. However, in the real-world, this is not a true representation of the area around the Eiffel tower. In other words, when compared with an actual photo taken of the area around the Eiffel tower, there are discrepancies that diminish the credibility of the first picture 120. For example, a second picture 110 of FIG. 1B can be understood to depict an actual photo taken of the Eiffel tower, which may have been retrieved via a web search engine such as Google® search, Bing® search, etc. When the two pictures are considered side by side, it is clear that there are features or elements that are out of place and not true to the real-world manifestation of the chosen landmark 114. Although there is a cloudy environment 112 in this picture, this can be disregarded as weather is a dynamic element. However, the park 118 that surrounds the landmark 114 is actually quite empty of manmade structures, and primarily includes trees and some paths, as well as the visitor center 190. In other words, there is no building 128 or Ferris wheel 124 that was generated in the first picture 120 of FIG. 1A. If the user were to unquestioningly include the generated image of first picture 120 in their brochure, their authority and reputation as a travel agency would likely be negatively impacted. For example, consumers browsing the brochure and noticing the discrepancies may become dismissive of the agency's products due to what they feel is a lack of attention to details and accuracy, and/or the agency may be perceived as unreliable or even as an entity promoting fraudulent products.

In many cases, an AI engine is configured to present multiple pictures in response to a user's prompt. In other words, rather than simply generating the first picture 120 shown in FIG. 1A, additional pictures that the AI engine determines are aligned with the user's prompt can be generated, such that the user may consider each picture an option from which they can make a selection. In the face of these options, it can be appreciated that the user would likely prioritize those pictures that are accurate and true-to-life, for at least the reasons described above. However, in order to make such an assessment, the user would need to either have first-hand (personal) knowledge of what the image should contain, or make additional queries that require their careful review of each AI-generated picture while searching for real-life images of the same locations depicted in each AI-generated picture.

In different embodiments, the proposed systems can enable an automated and expedited process by which the outputs (image options) of the AI engine are rapidly evaluated with respect to the degree to which they are aligned with the real-world objects, elements, location, etc. (i.e., content) that they are purporting to represent. In one embodiment, the system can evaluate the images produced by the AI engine (also referred to herein as "generated images" or "synthesized images") based at least in part on an already existing ground truth reference digital image that is retrieved via a search engine (also referred to herein as a "verification image"). The system can then objectively quantify the degree of realism with respect to each of the generated images.

Figure 2:
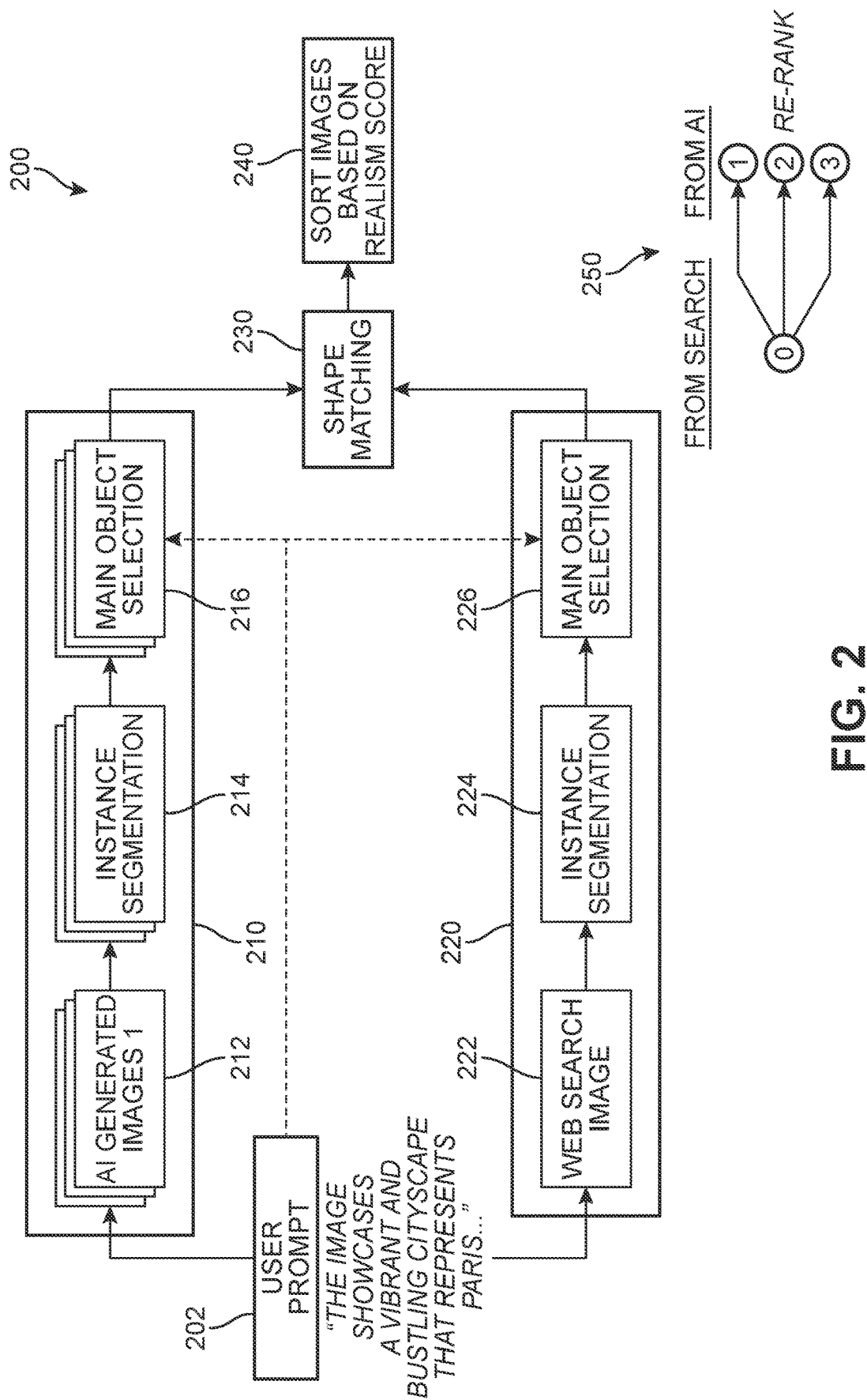
FIG. 2 is a high-level view of a realism assessment system, according to an embodiment.

Referring to FIG. 2, an example of a system process workflow 200 by which the proposed embodiments can be implemented is depicted. In this diagram, in an initial stage, a user prompt is received by the system, at two levels/paths: a first path 210 involving a generative AI model, and a second path 220 involving a web image search engine (e.g., TinEye Reverse Image Search Engine™, Google Images™, Yahoo Image Search™, Bing Image Search™, Pinterest™, Visual Search Tool™, etc.). In some embodiments, the processing of the prompt by both of these components can occur sequentially or at or around the same time (simultaneously).

For example, in the first path 210, the process can include a user prompt 202 being received by their chosen generative AI engine. In different embodiments, the generative AI engine can include, but is not limited to, applications such as DALL-E2®, Midjourney, DreamStudio® (Stable Diffusion), Firefly® (Photoshop), Dream by WOMBO®, Bing® Image Creator, Craiyon®, Scribe®, Jasper®, ChatGPT®, Dall-E2®, Autodesk's Generative Design®, Wordtune®, Notion®, GitHub Copilot®, VEED®, and Speechify®, etc.

In a first step 212, the AI engine can then create images based on the prompt (e.g., using available text-to-image creation tools such as but not limited to, for example, DALL-E and stable diffusion, among others). In a second step 214, the outputted generated images are processed by an instance segmentation module of the system, which will be discussed in further detail with reference to FIG. 3, to identify objects in the outputted images, resulting in the generation of labels and masks for each object. The segmented image is then used by the system to perform a main object selection at a third step 216 (e.g., see FIG. 4).

In second path 220, the user prompt 202 is received by the web search image in a fourth step 222. A real-world image corresponding to the closet match of the parameters of the prompt is retrieved. In other words, a web image search engine can look for images that are aligned with the parameters provided by the user's "search" (i.e., their prompt) and the top-matching image selected by the system. This verification image is segmented at a fifth step 224 (e.g., see FIG. 3) via the instance segmentation module to identify objects in the outputted images, resulting in the generation of labels and masks for each object. The main objects in the segmented verification image are selected in a sixth step 226.

In different embodiments, the main objects identified from both of these processes (first path 210 and second path 220) are then passed to a shape matching module 230 and the results used to determine how closely the generated images resemble or are aligned with the real-world retrieved image (e.g., see FIG. 5) in a sorting process 240. In some embodiments, the system produces a realism score for each generated image, and these scores can be used to output a ranking 250 of the generated images from most realistic to least realistic.

Figure 3:
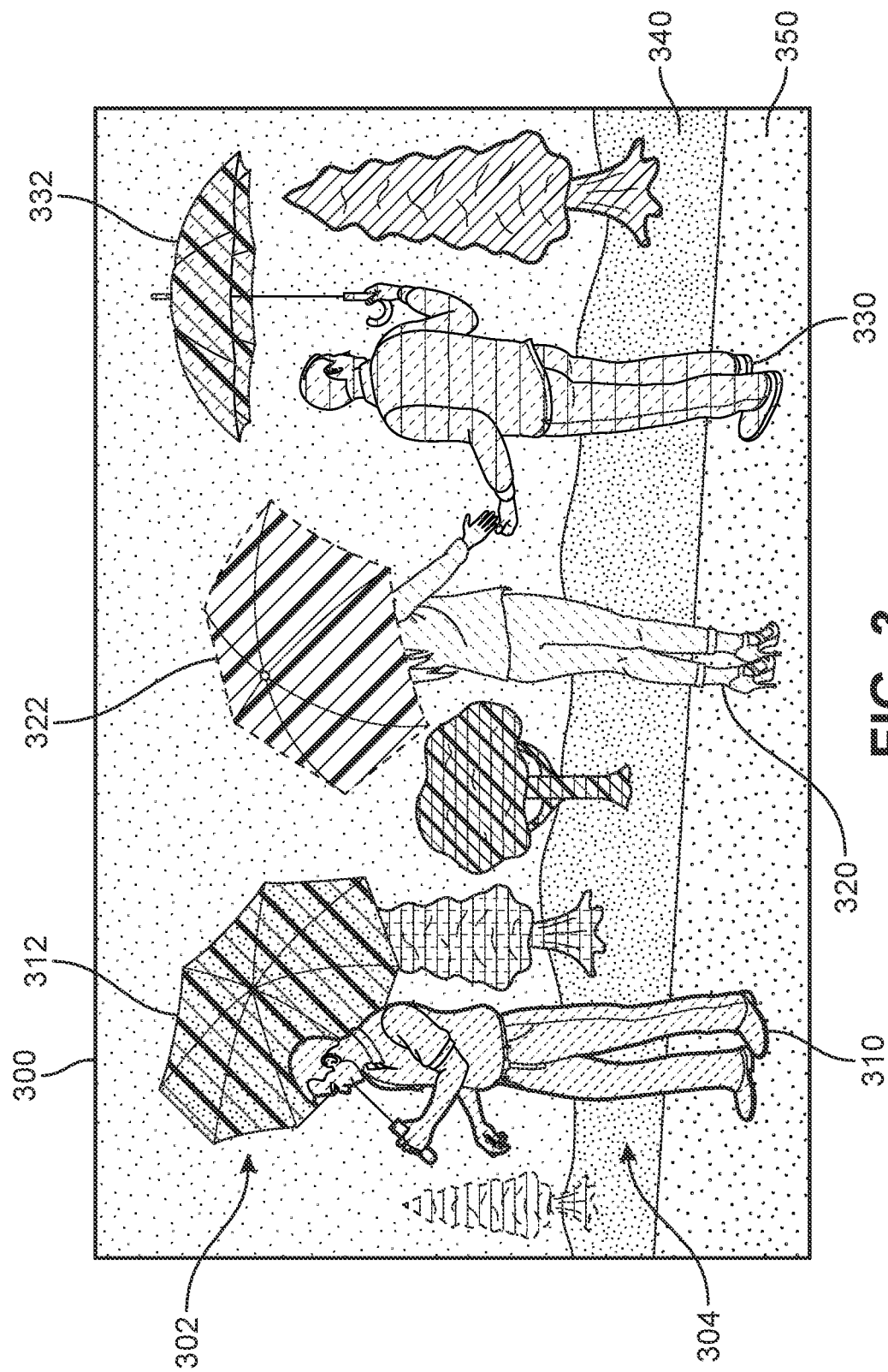
FIG. 3 is a schematic diagram depicting an output of a deep learning-based instance segmentation module of the realism assessment system, according to an embodiment.

Moving now to FIG. 3, an example of an image 300 processed and annotated by an instance segmentation module is depicted. As a general matter, instance segmentation refers to a computer vision task using a deep learning model for a fine-level detection and localization of an object in an image, and can be used to produce a pixel-wise segmentation map. Object detection or localization is an incremental step in progression from coarse to fine digital image inference. It not only provides the classes of the image objects, but also provides the location of the image objects which have been classified. The location is given in the form of bounding boxes or centroids. This is followed by semantic segmentation, which gives fine inference by predicting labels for every pixel in the input image. Each pixel is labelled according to the object class within which it is enclosed. Furthering this evolution, the techniques of instance segmentation give different labels for separate instances of objects belonging to the same class. Hence, instance segmentation may be defined as the technique of simultaneously solving the problem of object detection as well as that of semantic segmentation, where the goal of instance segmentation is to obtain a view of objects of the same class that are divided into different instances. The number of instances is not known in advance, and the evaluation of the obtained instances is not based on pixels (as with semantic segmentation). The resultant instance tagging of an image provides critical information for inferring unknown situations, for counting elements belonging to the same class, and for detecting certain objects.

Instance segmentation takes advantage of deep learning tools, such as but not limited to Convolutional Neural Networks (CNNs). Techniques for instance segmentation are increasingly available that achieve high accuracy and allow for fast response time. Some non-limiting examples of instance segmentation models that can be employed by the instance segmentation module include U-Net (2015), Mask R-CNN (2017), and SOLO (Segmenting Objects by Locations) (2019), and Facebook® AI Research's Detic (2021), which can currently detect twenty-thousand classes, with a backbone model incorporating the Swin Transformer, a type of deep learning architecture that combines a Transformer model with a hierarchical design. Thus, in some embodiments, the Detic model can be used to generate labels and masks for all objects in the digital images, including AI-generated images and search result images. Some other instance segmentation frameworks that can used by the proposed embodiments can include, but are not limited to Fast/Faster R-CNN, fully convolutional network (FCN), feature pyramid network (FPN), Multi-Path Network, Mask-Lab, Non-Local Neural Networks, Hybrid Task Cascade, Path Aggregation Network (PANet), GCNet, YOLACT, TensorMask, Mask Scoring R-CNN, etc.

In FIG. 3, an instance segmentation module of the proposed system can segment individual objects within an image at the pixel level. In this case, image segmentation of image 300 results in the classification of multiple objects based on pixel level labels for the image, with a label for each object as well as its mask representing the shape of that object. In different embodiments, the instance segmentation module employs a deep learning model that enables precise object boundaries (masks) and allows for detailed object-level analysis. Masking refers to the process of creating a binary mask that defines the boundaries of objects or regions of interest within an image. A mask therefore represents a specific portion of an image that is isolated from the rest of an image.

More specifically, in this example, the image 300 is annotated to show the discrete object classes with individual masks, such as a ground 340 and road 350. In addition, multiple objects that fall under the same object class are detected and differentiated, such as a first umbrella 312, a second umbrella 322, and a third umbrella 332 (each of these falling under object class umbrellas 302), and a first person 310, a second person 320, and a third person 330 (each of these falling under object class persons 304). Thus, the image instance segmentation allows for precise detection and classification not just of objects that are the same, but each of the distinct members of this 'same' object class. This process of instance segmentation can be performed on each of the images that are being evaluated by the proposed system as well as the potential reference digital image.

Figure 4:
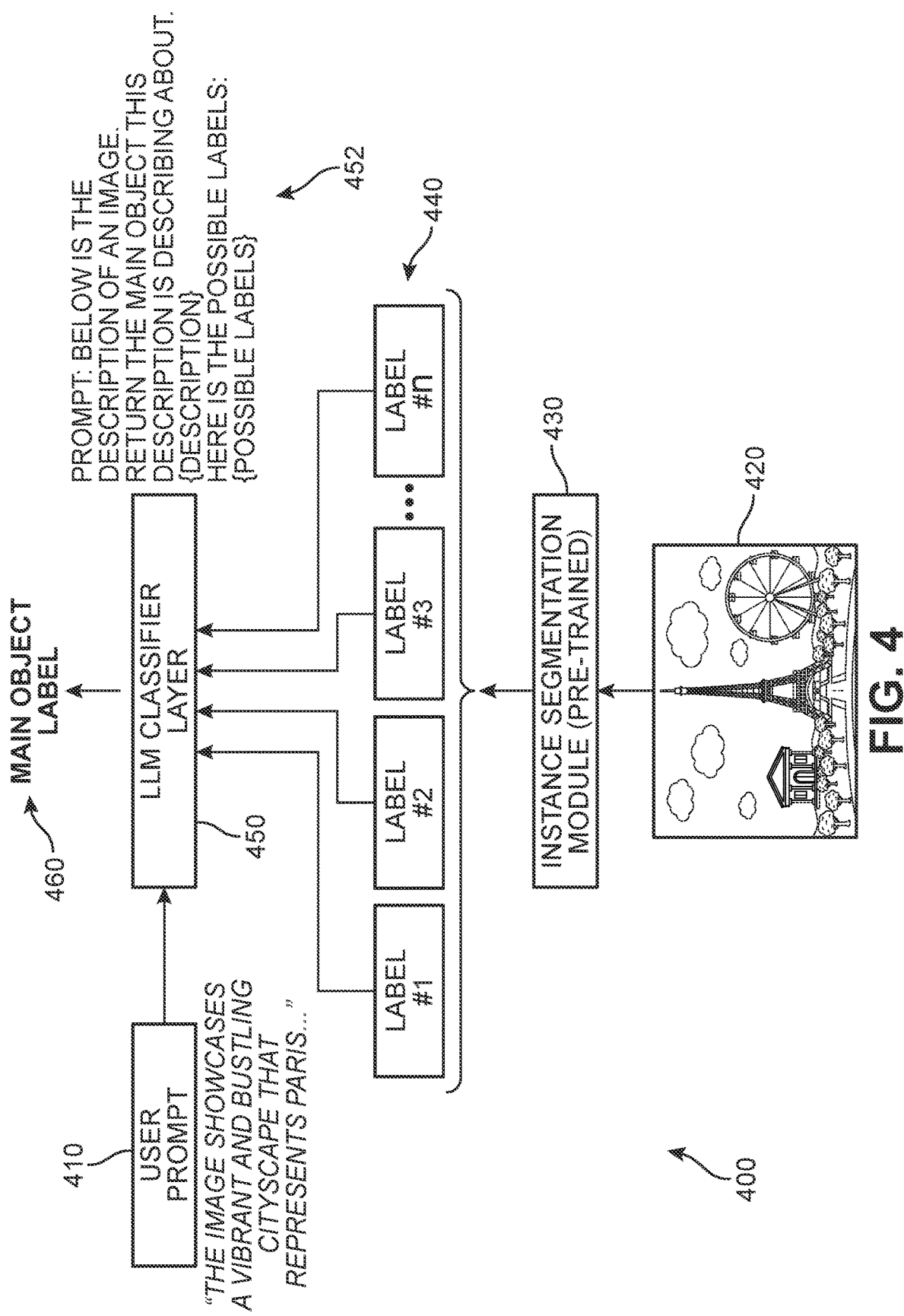
FIG. 4 is a schematic diagram depicting a process for selecting a main object in an image, according to an embodiment.

FIG. 4 shows a schematic flow diagram that illustrates a process by which embodiments of the proposed system can then proceed to identify a main object from the instances detected in each the segmented images. In other words, as an image, such as first image 420 in FIG. 4, passes through an instance segmentation module 430, multiple labels 440 become associated with the image (output of a deep learning instance segmentation model). The multiple labels 440 are fed to an LLM (large language model) classifier layer 450, along with original user prompt 410 that led to the generation of the first image 420 by the AI engine (e.g., "The image showcases a vibrant and bustling cityscape that represents Paris, France . . . "). The user prompt 410 can be processed by the LLM as an input request 452 (e.g., where LLM input is similar to the following: "Below is the description of an image. Return the main object this description is describing {DESCRIPTION BASED ON <USER PROMPT 410>}. Here are the possible labels {<MULTIPLE LABELS 440>}." The LLM classifier layer 450 can then determine, based on a comparison of the multiple labels 440 for the generated image, which one label corresponds to the main object in the generated image. In other words, the LLM classifier layer 450 can serve as an additional classifier that is using, for example, ChatGPT and will take two types of two types of input (the original prompt leading to the generated image from the AI engine and the set of labels that came from the instance segmentation module 430). This process will be performed for all of the generated images, as well as the verification image that was retrieved from the search engine.

Thus, in different embodiments, a main object selection module incorporating the LLM classifier layer 450 performs a classification on the labeled and masked objects detected by the deep learning-based instance segmentation model for all of the generated images and the search verification image. As a general matter, comparing each detected object in the generated image with the objects in the search image would be otherwise inefficient. To address this challenge, the main object selection module introduces this additional processing layer by which a large language (LLM)-based classifier filters out unnecessary object labels. In this approach, the LLM model receives two inputs: 1) the initial user prompt and 2) the list of labels detected from the instance segmentation module. The classifier can then identify the object label that best matches the original description.

Figure 5:
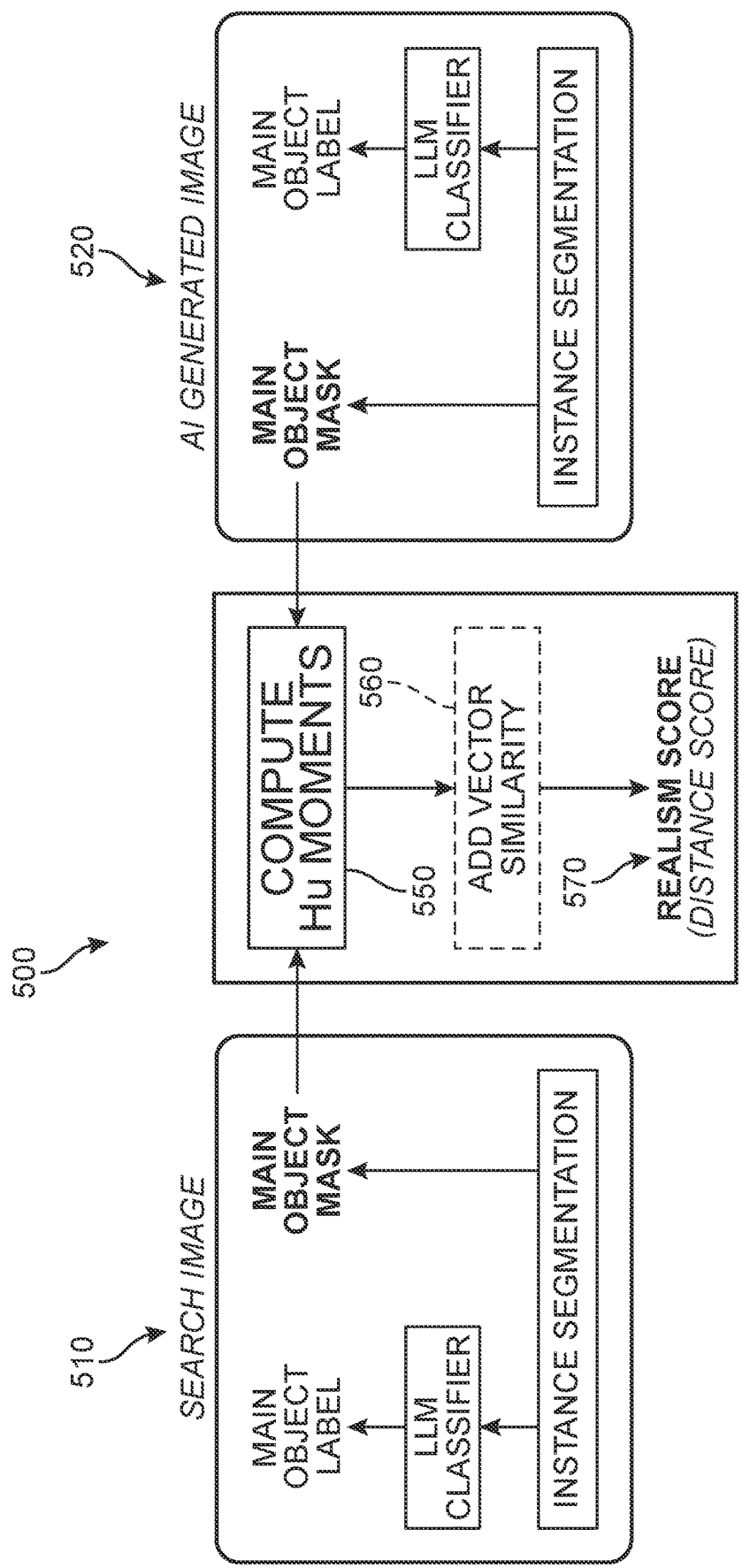
FIG. 5 is a schematic diagram depicting a process for generating realism scores, according to an embodiment.

Referring next to the diagram of FIG. 5, in different embodiments, the outputs of the main object selection module of FIG. 4 can then be received by a shape matching module 500. For example, a first processed image dataset 510 (including the results obtained from processing of the retrieved reference digital image) and a second processed image dataset 520 (including the results obtained from processing of an AI generated image) can be received by the shape matching module 500. It can be appreciated that there may be additional sets of data similar to second processed image dataset 520 (e.g., third processed image dataset, fourth processed image dataset, etc.) corresponding to the results obtained by the system for each of the generated AI images. Thus, for each of the images, data including a main object mask and main object label from that image are submitted to the shape matching module 500. In some embodiments, a technique is implemented in which image moments are computed for each dataset. In image processing, computer vision and related fields, an image moment is a certain particular weighted average of the image pixels' intensities, or a function of such moments, usually chosen to have some attractive property or interpretation.

For example, in some embodiments, the shape matching module 500 can compare the mask shapes detected in the search (verification) image and the mask shapes detected in the generated images using Hu Moments 550 (or Hu Moment invariants, or other image descriptor image characterization tools) to obtain a Realism Score 570. With this approach, a smaller score indicates a better approximation of the real world by the generated image. In an optional example, the shape matching module 500 computes the similarity between the two image vector embeddings and incorporate it into the realism score. However, in some embodiments, the shape matching module 500 can place a greater importance or weight on the shape-based score as the comparison based on image embedding tends to emphasize visual style similarities. In different embodiments, this process is repeated for all AI-generated images, allowing the system to rank the images based on their calculated realism scores.

Feature vector representations of structures (condensed representations) of objects may be used to match their corresponding structures, which may significantly reduce the number of computations. This matching of feature vector representations is more streamlined and efficient than conventional brute force pixel to pixel matching. The feature vector representation may encode the object shape into the features. For example, Hu Moments may be used as the feature vector representation. It can be appreciated that the use of a technique such as image moments (in particular, Hu Moments) can be beneficial when assessing shapes that are depicted in images that were captured or generated for the same or similar objects but at different angles (perspectives), scales, color, patterns, etc. For example, the orientation of a main object in the verification image may differ from the orientation of the same object that is depicted in the AI generated image.

Hu Moments can be used to describe, characterize, and quantify the general shape of an object in an image. The shape matching module 500 incorporates extraction and/or computation of each of the main objects' Hu Moments to determine the similarity between images. As a general matter, image moments and the related invariants can be used to characterize the patterns in images, with some well-known moments including geometric moments, zernike moments, rotational moments, and complex moments. Moment invariants are firstly introduced by Hu, and have been since generalized. Hu derived six absolute orthogonal invariants and one skew orthogonal invariant based upon algebraic invariants, which are not only independent of position, size and orientation but also independent of parallel projection. These moment invariants have been proved to be the adequate measures for tracing image patterns regarding the image's translation, scaling and rotation under the assumption of images with continuous functions and noise-free. Moment invariants have been extensively applied to image pattern recognition.

In different embodiments, the shape matching module 500 can therefore compute Hu Moments 550 to characterize the shape of the main object in an image. These moments capture basic information such as the area of the object, the centroid (i.e., the center (x, y)-coordinates of the object), the orientation, and other desirable properties. Additional information regarding these moments can be found in Ming-Kuei Hu's 1962 paper, Visual Pattern Recognition by Moment Invariants, incorporated by reference herein in its entirety, in which Hu proposed 7 moments that can be used to characterize the shape of an object in an image. In some embodiments, the Hu Moments image descriptor can be used to quantify the shape of an object in an image. The shape to be described can either be a segmented binary image or the boundary of the object (i.e., the "outline" or "contour" of the shape). During computation, the Hu Moments descriptor returns a real-valued feature vector of 7 values. These 7 values capture and quantify the shape of the object in an image. The shape matching module 500 can then compare the shape feature vector to the reference feature vectors to determine how "similar" two shapes are (e.g., via a vector similarity module 560). This approach thereby takes into consideration the angular or rotational differences in the shapes found in the generated images and the reference digital image. The computed Hu moment can then used to produce the realism score 570. For purposes of this application, the realism score 570 enables a prediction by the system regarding which generated image is most closely alike to or matches the reference digital image.

In some optional embodiments, the vector similarity module 560 of the shape matching module 500 can further embed each object's mask into a vector space and compute the cosine similarity between these mask embeddings. In such cases, the cosine similarity is then added to the Hu moment score to produce the final realism score 570. This approach allows the system to take into account the image's main object as a shape well as the semantic meaning of image as a whole (e.g., what is the color or texture of the object, or stylistic features of the object, etc.), allowing for a more comprehensive and holistic comparisons between the generated images and the reference digital image.

Figure 6:
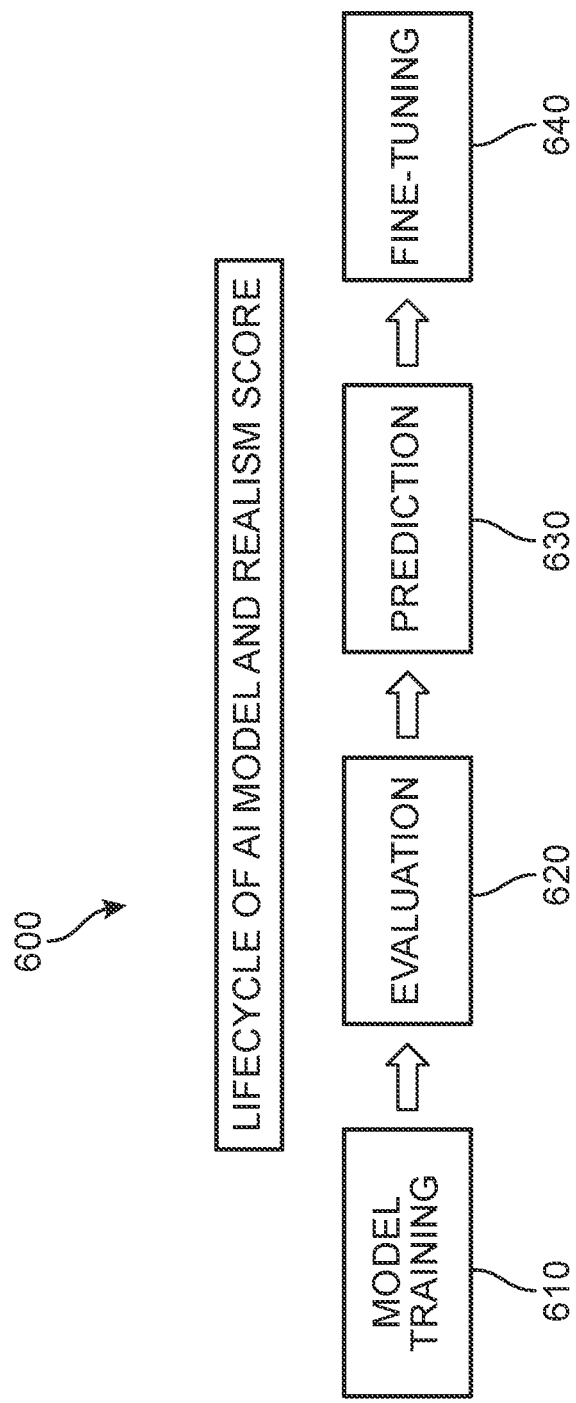
FIG. 6 is a schematic diagram showing an overview of a lifecycle of an AI model and realism score feedback applied at each stage, according to an embodiment.

While the realism score 570 that is outputted by the system offers benefits and improvements in the predicted accuracy of an AI-generated image, it should be understood that there is a plethora of additional advantages that can be enabled by the proposed embodiments. Some potential applications of the obtained realism scores are discussed with reference to different stages 600 of model development following a model training stage 610 are discussed now with reference to FIG. 6.

For example, the use of the realism score as a concept can be incorporated into the generative AI model's development at the evaluation stage and/or help serve as a fine-tuning mechanism. In other words, while the outputted realism scores can be used to sort and rank generated images, as part of a Prediction Stage 630 performed by the system, their applicability extends beyond image ranking and can be employed in other settings, such as but not limited to a model evaluation stage 620 and a model fine-tuning stage 640. For example, with respect to the model evaluation stage, during evaluation of image generation models, a series of image descriptions is prepared and provided as input to candidate models. To establish ground truth labels, the same descriptions are used as keywords in a search engine to retrieve corresponding real-world images. In such cases, realism scores can be computed for each generated image, and an average realism score obtained. By repeating this process for multiple models, average scores can be calculated for each model, enabling a comparison based on their ability to approximate the real world. In other words, the realism score can serve as an evaluation metric to compare which model of a plurality of models produces more realistic images. For example, the system can generate multiple images from each model using the same prompt and calculate the realism scores. An average realism score can be obtained for each model based on the full set of generated images. The average realism score then can indicate which AI model is most likely to generate images that are at the highest level of realism.

In some embodiments, where there is a small subset of images that are to be used to fine-tune the model, such as landscape images depicting a particular city, the realism score can be incorporated into the overall loss terms (e.g., adversarial loss and reconstruction loss) to guide the model. In some embodiments, the realism score can be used to alternatively represent a measurement of the loss of realism in a given image by inverting the realism score, which can allow for a further understanding of the extent to which the generated image is 'missing' some key real-world feature. By leveraging the realism score, which relies on the shape and contour of objects, the system can automatically enforce accurate object shapes in the generated images. Thus, the realism score can be used to fine-tune the selected AI model and generate more realistic images. In another example, the realism scores can be used to iteratively improve the performance of the selected AI model. For example, in some embodiments, the system instructs the AI model to shift or align its output to only those images that can match or exceed a particular realism score threshold or similarity level, allowing the realism scores to serve as ongoing feedback that reinforces the model and improve the model outputs with each cycle. In one example, the realism score can indicate which candidate synthesized image had feature sets that best aligned with a user's prompt and was closest to the ground truth represented by the reference digital image, and those feature sets will be used as feedback in fine-tuning the model's performance.

In different embodiments, the proposed systems can also include a ground truth selection module to evaluate images retrieved from a search engine. In some embodiments, the ground truth selection module can include an AI-based image captioning generator. As a general matter, image captioning generators use deep learning techniques to perform a process of recognizing a context of an image and annotating it with relevant captions using deep learning and computer vision. This process can includes labeling an image with English (or other language) keywords with the help of datasets provided during model training. Some datasets that could be used to train such a model include but are not limited to (a) Common Objects in Context (COCO); (b) Flickr 8K; (c) Flickr 30K; (d) Exploring Image Captioning Datasets, etc.

Thus, in different embodiments, once the system submits the user's prompt to a web-based search engine, the top set of images (e.g., top two, three, four, five, ten, etc.) retrieved from the search engine in response to the user's prompt can be processed and translated or converted into text descriptions of that image (captions). Each caption will then be compared with the user's original prompt to assess their degree of similarity. In some embodiments, the caption that is most similar to the user's prompt can be selected as representing the image that best matches the user's request. This image can then be assigned as the reference digital image that will be used by the system when determining how realistic the generated images are.

In still other embodiments, the generated (synthetic) images can also be converted to text via such image captioning generators, and the resultant captions compared to the user prompt. The captions can be ranked in order of how similar they are to the user prompt, and this information can be incorporated into the final realism score that is calculated for the image from which the caption was generated. In other words, the similarity between the captions for the synthetic digital images and the user prompt can also contribute or be used to fine-tune the final determination and ranking of which synthetic digital image is the most realistic.

In different embodiments, other applications of the proposed embodiments can be provided. For example, in some embodiments, the system can be implemented in ensuring images that are generated with specific goals, directions, targets, or themes are faithfully maintained. More specifically, an advertising company or other entity may have a brand (e.g., product) and desire synthesized images that promote or ideally contextualize said brand. The realism assessment systems can be used to carefully cull candidate images that stray from the branding themes while selecting those candidate images that stay true to (i.e., "are realistic) the ground truth the company is looking to promote. Thus, in some cases, the term "realism score" can refer not just to how close to reality the image is, but how close to (or far from) to a brand's concepts or themes the image is, to automatically tailor the output of the generative AI model to those images that uphold the integrity of the company's values.

Figure 7:
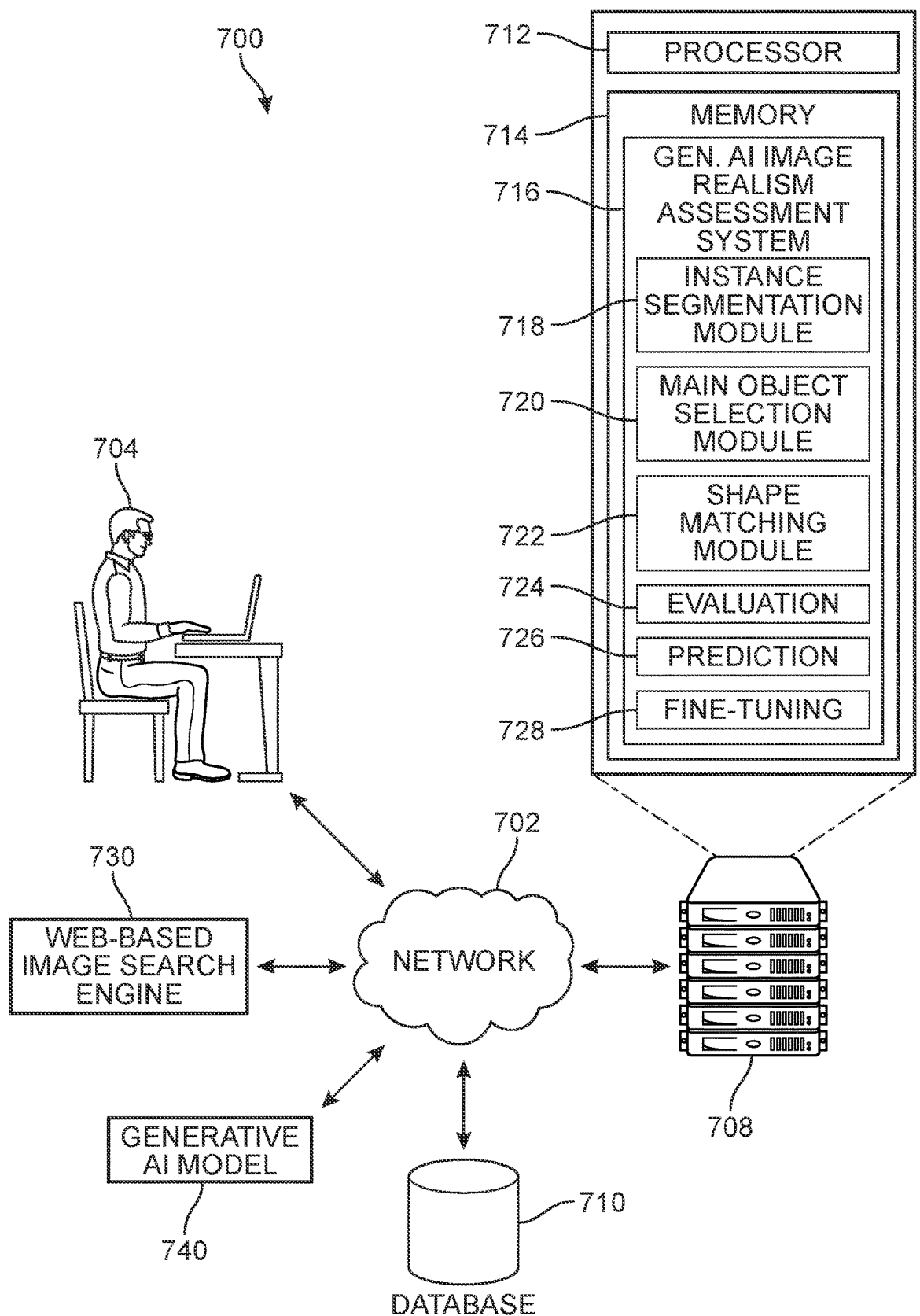
FIG. 7 is a diagram depicting example environments and components by which systems and/or methods, described herein, may be implemented.

For purposes of clarity, one example of an environment 700 for implementation of the proposed systems is depicted in FIG. 7, according to an embodiment. The environment 700 may include a plurality of components capable of performing the disclosed method of AI-generated image realism evaluation. For example, environment 700 includes a first user device 704, computing system 708, a network 702, and a knowledge base (database) 710. The components of environment 700 can communicate with each other through network 702. In some embodiments, network 702 may be a wide area network ("WAN"), e.g., the Internet. In other embodiments, network 702 may be a local area network ("LAN").

As shown in FIG. 7, a generative AI image realism assessment system 716 may be hosted in computing system 708, which may have a memory 714 and a processor 712. Processor 712 may include a single device processor located on a single device, or it may include multiple device processors located on one or more physical devices. Memory 714 may include any type of storage, which may be physically located on one physical device, or on multiple physical devices. In some cases, computing system 708 may comprise one or more servers that are used to host the generative AI image realism assessment system 716 and its associated modules (instance segmentation module 718, main object selection module 720, shape matching module 722, and application operations such as an evaluation function 724, prediction function 726, and a fine-tuning function 728.

In different embodiments, database 710 may store data that may be retrieved by other components for system 700, such as realism scoring guidance, training data, and other features that can be referenced by the generative AI and/or the generative AI image realism assessment system. In some embodiments, the database 710 includes a knowledge repository that can be used by instance segmentation module 718 to determine how finely objects should be identified. In addition, the environment 700 includes an image search engine 730, and a generative AI model 740, as described herein, with which the generative AI image realism assessment system shares and receives prompts and image-related data.

While FIG. 7 shows a single user device, it is understood that more user devices may be used. For example, in some embodiments, the system may include two or three user devices. In some embodiments, the user device may be a computing device used by a user. For example, first user device 704 may include a smartphone or a tablet computer. In other examples, first user device 704 may include a laptop computer, a desktop computer, and/or another type of computing device. The user devices may be used for inputting, processing, and displaying information. The number and arrangement of components shown in FIG. 7 are provided as an example. In practice, the system may include additional components, fewer components, different components, or differently arranged components than those shown in FIG. 7. Additionally, or alternatively, a set of components (e.g., one or more components) of the system may perform one or more functions described as being performed by another set of components of the system 700.

The examples in the drawings show some of many possible different implementation contexts. In that respect, the technical solutions are not limited in their application to the architectures and systems shown in the drawings and described herein, but are applicable to many other implementations, architectures, and processing.

Figure 8:
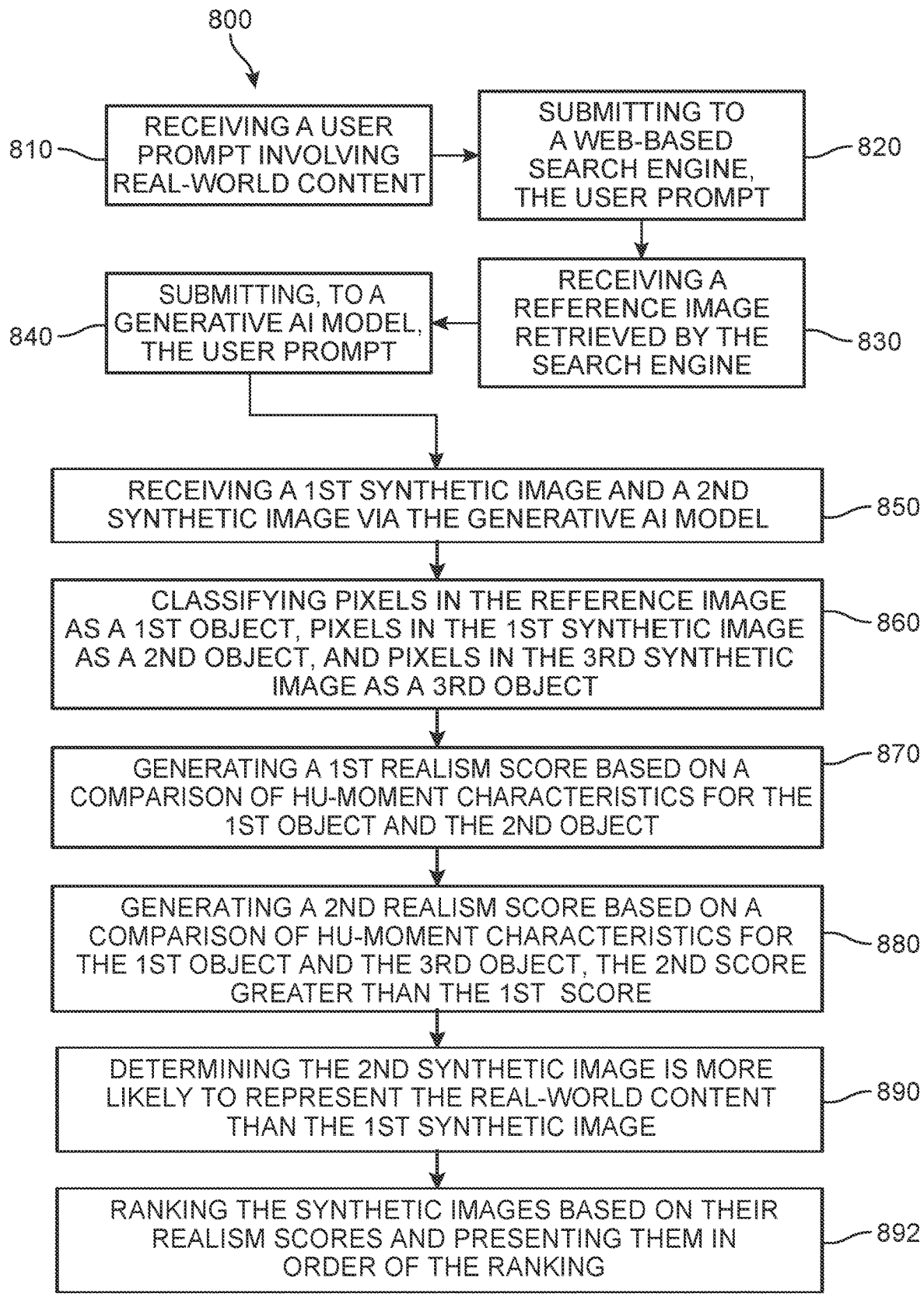
FIG. 8 is a flow chart presenting a method of extracting object information from digital images, according to an embodiment.

FIG. 8 is a flow chart illustrating an embodiment of a method 800 of extracting object information from digital images. The method 800 includes a step 810 of receiving, at a realism assessment system, a user prompt involving real-world content, and a step 820 of submitting, from the realism assessment system and to a web-based search engine, the user prompt. In addition, a step 830 includes receiving, at the realism assessment system, a reference digital image retrieved by the search engine in response to the user prompt, and a step 840 includes submitting, from the realism assessment system and to a first generative AI model, the user prompt. A step 850 of the method 800 includes receiving, at the realism assessment system, a plurality of synthetic digital images including a first synthetic digital image and a second synthetic digital image, the plurality of synthetic digital images generated by the first generative AI model in response to the user prompt. A step 860 includes automatically classifying, via a deep learning-based instance segmentation model of the realism assessment system, a first set of pixels in the reference digital image as corresponding to a first object, a second set of pixels in the first synthetic digital image as corresponding to a second object, and a third set of pixels in the second synthetic digital image as corresponding to a third object. The method may include extracting one or more Hu Moments for each of the first object, the second object, and the third object. Method 800 includes step 870 of generating, at the realism assessment system, a first realism score based on a comparison of characteristics of the first object with the second object by comparing the one or more Hu Moments for the first object and the second object. Furthermore, the method 800 includes a step 880 of generating, at the realism assessment system, a second realism score based on a comparison of characteristics of the first object with the third object by comparing the one or more Hu Moments for the first object and the third object, the second realism score being greater than the first realism score. Method 800 includes a step 890 of determining, at the realism assessment system, the second synthetic digital image has a greater likelihood of accurately representing the real-world content than the first synthetic digital image based on the second realism score being greater than the first realism score. A step 892 includes ranking each synthetic digital image of the plurality of synthetic digital images based on their computed realism score and presenting, at a computing device, the synthetic digital images in order of their ranking.

In other embodiments, the method may include additional steps or aspects. In one example, the computed Hu Moments are used to characterize the shape of a main object in each of the reference digital image, the first image, and the second image, the main object being identified by a large language (LLM)-based classifier. In some embodiments, the method also includes steps of: detecting, via the instance segmentation module, a first set of objects in the reference digital image including at least the first object and a fourth object; generating, via the instance segmentation model, a label for each object in the first set of objects; passing both the user prompt and the labels for the objects in the first set of objects to a large language model (LLM) classifier; and identifying, via the LLM classifier, a first main object from the first set of objects, wherein the first main object corresponds to the first object. In some cases, the method can also include steps of: detecting, via the instance segmentation module, a second set of objects in the first synthetic digital image including at least the second object and a fifth object; generating, via the instance segmentation model, a label for each object in the second set of objects; passing both the user prompt and the labels for the objects in the second set of objects to the LLM classifier; and identifying, via the LLM classifier, a second main object from the second set of objects, wherein the second main object corresponds to the second object. In one example, the method also includes filtering out characteristics of the fourth object and the fifth object by the LLM classifier before generating the first realism score such that characteristics of the fourth object and the fifth object are disregarded when generating the first realism score. In some embodiments, the synthesized image associated with the highest realism score will be automatically selected and presented to the user via a computing device, while the remaining images are either excluded from presentation or de-prioritized in their presentation.

In different embodiments, the method can also include ranking each synthetic digital image of the plurality of synthetic digital images based on their computed realism score; and presenting, at a computing device, each of the synthetic digital images of the plurality of synthetic digital images in order of their ranking. In some embodiments, the method further includes receiving, at the realism assessment system, a first image and a second image both retrieved by the search engine in response to the user prompt; converting, via an image captioning AI generator, the first image to a first text description; converting, via the image captioning AI generator, the second image to a second text description; determining the first text description is more similar to the user prompt than the second text description; and selecting the first image as the reference digital image in response to the first text description being more similar to the user prompt than the second text description.

For purposes of this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons/options or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with the user interface, or other such information presentation.

It should be understood that the text, images, and specific application features shown in the figures are for purposes of illustration only and in no way limit the manner by which the application may communicate or receive information. In addition, in other embodiments, one or more options or other fields and text may appear differently and/or may be displayed or generated anywhere else on the screen(s) associated with the client's system, including spaced apart from, adjacent to, or around the user interface. In other words, the figures present only one possible layout of the interface, and do not in any way limit the presentation arrangement of any of the disclosed features.

Embodiments may include a non-transitory computer-readable medium (CRM) storing software comprising instructions executable by one or more computers which, upon such execution, cause the one or more computers to perform the disclosed methods. Non-transitory CRM may refer to a CRM that stores data for short periods or in the presence of power such as a memory device or Random Access Memory (RAM). For example, a non-transitory computer-readable medium may include storage components, such as, a hard disk (e.g., a magnetic disk, an optical disk, a magneto-optic disk, and/or a solid-state disk), a compact disc (CD), a digital versatile disc (DVD), a floppy disk, a cartridge, and/or a magnetic tape.

To provide further context, in some embodiments, some of the processes described herein can be understood to operate in a system architecture that can include a plurality of virtual local area network (VLAN) workstations at different locations that communicate with a main data center with dedicated virtual servers such as a web server for user interfaces, an app server for OCR and data processing, a database for data storage, etc. As a general matter, a virtual server is a type of virtual machine (VM) that is executed on a hardware component (e.g., server). In some examples, multiple VMs can be deployed on one or more servers.

In different embodiments, the system may be hosted at least in part in a cloud computing environment offering ready scalability and security. The cloud computing environment can include, for example, an environment that hosts the document processing management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource"). It is contemplated that implementations of the present disclosure can be realized with appropriate cloud providers (e.g., AWS provided by Amazon™, GCP provided by Google™, Azure provided by Microsoft™, etc.).

The methods, devices, and processing described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

In addition, the system can include one or more devices capable of receiving, generating, storing, processing, and/or providing information, such as information described herein. For example, the system may include one or more computing devices, such as one or more server devices, desktop computers, workstation computers, virtual machines (VMs) provided in a cloud computing environment, or similar devices. The systems can be configured to exchange information over one or more wired and/or wireless networks. For example, networks may include a cellular network, a public land mobile network (PLMN), a local area network (LAN), a personal area network (PAN) such as Bluetooth, a wide area network (WAN), a metropolitan area network (MAN), a telephone network (e.g., the Public Switched Telephone Network (PSTN)), an ad hoc network, an intranet, the Internet, a fiber optic-based network, a cloud computing network, a private network, and/or a combination of these or other types of networks.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer-implemented method for extracting object information from digital images, the method comprising:
   receiving, at a realism assessment system, a user prompt involving real-world content;
   submitting, from the realism assessment system and to a web-based search engine, the user prompt;
   receiving, at the realism assessment system, a reference digital image retrieved by the search engine in response to the user prompt;
   submitting, from the realism assessment system and to a first generative artificial intelligence (AI) model, the user prompt;
   receiving, at the realism assessment system, a plurality of synthetic digital images including a first synthetic digital image and a second synthetic digital image, the plurality of synthetic digital images generated by the first generative AI model in response to the user prompt;
   automatically classifying, via a deep learning-based instance segmentation model of the realism assessment system, a first set of pixels in the reference digital image as corresponding to a first object, a second set of pixels in the first synthetic digital image as corresponding to a second object, and a third set of pixels in the second synthetic digital image as corresponding to a third object;
   extracting one or more Hu Moments for each of the first object, the second object, and the third object;
   generating, at the realism assessment system, a first realism score based on a comparison of characteristics of the first object with the second object by comparing the one or more Hu Moments for the first object and the second object;
   generating, at the realism assessment system, a second realism score based on a comparison of characteristics of the first object with the third object by comparing the one or more Hu Moments for the first object and the third object, the second realism score being greater than the first realism score;
   determining, at the realism assessment system, the second synthetic digital image has a greater likelihood of accurately representing the real-world content than the first synthetic digital image based on the second realism score being greater than the first realism score; and
   ranking each synthetic digital image of the plurality of synthetic digital images based on their computed realism score and presenting, at a computing device, the synthetic digital images in order of their ranking.

2. The method of claim 1, wherein the computed Hu Moments are used to characterize the shape of a main object in each of the reference digital image, the first image, and the second image, the main object being identified by a large language (LLM)-based classifier.

3. The method of claim 1, further comprising:
   detecting, via the deep learning-based instance segmentation model, a first set of objects in the reference digital image including at least the first object and a fourth object;
   generating, via the deep learning-based instance segmentation model, a label for each object in the first set of objects;
   passing both the user prompt and the labels for the objects in the first set of objects to a large language model (LLM) classifier; and
   identifying, via the LLM classifier, a first main object from the first set of objects, wherein the first main object corresponds to the first object.

4. The method of claim 3, further comprising:
   detecting, via the instance segmentation model, a second set of objects in the first synthetic digital image including at least the second object and a fifth object;
   generating, via the instance segmentation model, a label for each object in the second set of objects;
   passing both the user prompt and the labels for the objects in the second set of objects to the LLM classifier; and
   identifying, via the LLM classifier, a second main object from the second set of objects, wherein the second main object corresponds to the second object.

5. The method of claim 4, further comprising filtering out characteristics of the fourth object and the fifth object by the LLM classifier before generating the first realism score.

6. The method of claim 1, further comprising excluding from presentation at the computing device the synthetic digital images of the plurality of synthetic digital images that are assigned a realism score below a predesignated first threshold score.

7. The method of claim 1, further comprising:
receiving, at the realism assessment system, a first image and a second image both retrieved by the search engine in response to the user prompt;
converting, via an image captioning AI generator, the first image to a first text description;
converting, via the image captioning AI generator, the second image to a second text description;
determining the first text description is more similar to the user prompt than the second text description; and
selecting the first image as the reference digital image in response to the first text description being more similar to the user prompt than the second text description.

8. A non-transitory computer-readable medium storing software comprising instructions executable by one or more computers which, upon such execution, cause the one or more computers to extract object information from digital images by:
receiving, at a realism assessment system, a user prompt involving real-world content;
submitting, from the realism assessment system and to a web-based search engine, the user prompt;
receiving, at the realism assessment system, a reference digital image retrieved by the search engine in response to the user prompt;
submitting, from the realism assessment system and to a first generative AI model, the user prompt;
receiving, at the realism assessment system, a plurality of synthetic digital images including a first synthetic digital image and a second synthetic digital image, the plurality of synthetic digital images generated by the first generative AI model in response to the user prompt;
automatically classifying, via a deep learning-based instance segmentation model of the realism assessment system, a first set of pixels in the reference digital image as corresponding to a first object, a second set of pixels in the first synthetic digital image as corresponding to a second object, and a third set of pixels in the second synthetic digital image as corresponding to a third object;
extracting one or more Hu Moments for each of the first object, the second object, and the third object;
generating, at the realism assessment system, a first realism score based on a comparison of characteristics of the first object with the second object by comparing the one or more Hu Moments for the first object and the second object;
generating, at the realism assessment system, a second realism score based on a comparison of characteristics of the first object with the third object by comparing the one or more Hu Moments for the first object and the third object, the second realism score being greater than the first realism score;
determining, at the realism assessment system, the second synthetic digital image has a greater likelihood of accurately representing the real-world content than the first synthetic digital image based on the second realism score being greater than the first realism score; and
ranking each synthetic digital image of the plurality of synthetic digital images based on their computed realism score and presenting, at a computing device, the synthetic digital images in order of their ranking.

9. The non-transitory computer-readable medium of claim 8, wherein the computed Hu Moments are used to characterize the shape of a main object in each of the reference digital image, the first image, and the second image, the main object being identified by a large language (LLM)-based classifier.

10. The non-transitory computer-readable medium of claim 8, wherein the instructions further cause the one or more computers to:
detect, via the deep learning-based instance segmentation model, a first set of objects in the reference digital image including at least the first object and a fourth object;
generate, via the deep learning-based instance segmentation model, a label for each object in the first set of objects;
pass both the user prompt and the labels for the objects in the first set of objects to a large language model (LLM) classifier; and
identify, via the LLM classifier, a first main object from the first set of objects, wherein the first main object corresponds to the first object.

11. The non-transitory computer-readable medium of claim 10, wherein the instructions further cause the one or more computers to:
detect, via the instance segmentation model, a second set of objects in the first synthetic digital image including at least the second object and a fifth object;
generate, via the instance segmentation model, a label for each object in the second set of objects;
pass both the user prompt and the labels for the objects in the second set of objects to the LLM classifier; and
identify, via the LLM classifier, a second main object from the second set of objects, wherein the second main object corresponds to the second object.

12. The non-transitory computer-readable medium of claim 11, further comprising filtering out characteristics of the fourth object and the fifth object by the LLM classifier before generating the first realism score.

13. The non-transitory computer-readable medium of claim 8, wherein the instructions further cause the one or more computers to exclude from presentation at the computing device the synthetic digital images of the plurality of synthetic digital images that are assigned a realism score below a predesignated first threshold score.

14. The non-transitory computer-readable medium of claim 8, wherein the instructions further cause the one or more computers to:
receive, at the realism assessment system, a first image and a second image both retrieved by the search engine in response to the user prompt;
convert, via an image captioning AI generator, the first image to a first text description;
convert, via the image captioning AI generator, the second image to a second text description;
determine the first text description is more similar to the user prompt than the second text description; and
select the first image as the reference digital image in response to the first text description being more similar to the user prompt than the second text description.

15. A system for extracting object information from digital images comprising one or more computers and one or more storage devices storing instructions that are operable, when executed by the one or more computers, to cause the one or more computers to:

receive, at a realism assessment system, a user prompt involving real-world content;

submit, from the realism assessment system and to a web-based search engine, the user prompt;

receive, at the realism assessment system, a reference digital image retrieved by the search engine in response to the user prompt;

submit, from the realism assessment system and to a first generative AI model, the user prompt;

receive, at the realism assessment system, a plurality of synthetic digital images including a first synthetic digital image and a second synthetic digital image, the plurality of synthetic digital images generated by the first generative AI model in response to the user prompt;

automatically classify, via a deep learning-based instance segmentation model of the realism assessment system, a first set of pixels in the reference digital image as corresponding to a first object, a second set of pixels in the first synthetic digital image as corresponding to a second object, and a third set of pixels in the second synthetic digital image as corresponding to a third object;

extract one or more Hu Moments for each of the first object, the second object, and the third object;

generate, at the realism assessment system, a first realism score based on a comparison of characteristics of the first object with the second object by comparing the one or more Hu Moments for the first object and the second object;

generate, at the realism assessment system, a second realism score based on a comparison of characteristics of the first object with the third object by comparing the one or more Hu Moments for the first object and the third object, the second realism score being greater than the first realism score;

determine, at the realism assessment system, the second synthetic digital image has a greater likelihood of accurately representing the real-world content than the first synthetic digital image based on the second realism score being greater than the first realism score; and rank each synthetic digital image of the plurality of synthetic digital images based on their computed realism score and present, at a computing device, the synthetic digital images in order of their ranking.

16. The system of claim 15, wherein the computed Hu Moments are used to characterize the shape of a main object in each of the reference digital image, the first image, and the second image, the main object being identified by a large language (LLM)-based classifier.

17. The system of claim 15, wherein the instructions further cause the one or more computers to:

detect, via deep learning-based instance segmentation model, a first set of objects in the reference digital image including at least the first object and a fourth object;

generate, via the deep learning-based instance segmentation model, a label for each object in the first set of objects;

pass both the user prompt and the labels for the objects in the first set of objects to a large language model (LLM) classifier; and identify, via the LLM classifier, a first main object from the first set of objects, wherein the first main object corresponds to the first object.

18. The system of claim 17, wherein the instructions further cause the one or more computers to:

detect, via the deep learning-based instance segmentation model, a second set of objects in the first synthetic digital image including at least the second object and a fifth object;

generate, via the deep learning-based instance segmentation model, a label for each object in the second set of objects;

pass both the user prompt and the labels for the objects in the second set of objects to the LLM classifier; and identify, via the LLM classifier, a second main object from the second set of objects, wherein the second main object corresponds to the second object.

19. The system of claim 15, wherein the instructions further cause the one or more computers to exclude from presentation at the computing device the synthetic digital images of the plurality of synthetic digital images that are assigned a realism score below a predesignated first threshold score.

20. The system of claim 15, wherein the instructions further cause the one or more computers to:

receive, at the realism assessment system, a first image and a second image both retrieved by the search engine in response to the user prompt;

convert, via an image captioning AI generator, the first image to a first text description;

convert, via the image captioning AI generator, the second image to a second text description;

determine the first text description is more similar to the user prompt than the second text description; and select the first image as the reference digital image in response to the first text description being more similar to the user prompt than the second text description.

* * * * *